United States Statutory Invention Registration [19]

[11] Reg. Number: H107

Bauer [45] Published: Aug. 5, 1986

[54] TRIGGER MECHANISM

[75] Inventor: Kevin T. Bauer, Warwick, N.Y.

[73] Assignee: The United States of America as represented by the Secretary of the Army, Washington, D.C.

[21] Appl. No.: 777,793

[22] Filed: Sep. 19, 1985

[51] Int. Cl.[4] ..... F41D 11/02

[52] U.S. Cl. ..... 89/149; 89/148

*Primary Examiner*—Stephen C. Bentley

*Attorney, Agent, or Firm*—Anthony Lane; Robert Gibson; Edward F. Costigan

[57] ABSTRACT

A trigger mechanism for an automatic weapon which has a bolt carrier reciprocatably mounted in a receiver and biased to slide from a recoiled position to a firing position. The mechanism has a hammer positioned alongside the bolt carrier and pivotally mounted on the receiver for reciprocating between a retracted and a striking position. Also included are a bias spring, a trigger and a catch. The trigger is rotatably mounted on the receiver while the bias spring is attached to the hammer for urging it into a striking position. The catch is connected between the trigger and the hammer for releasably holding the hammer. The catch can retract the hammer in response to rotation of the trigger. The bolt carrier has a stop for engaging the hammer and holding the bolt carrier at its recoiled position. The catch is operable to release the bolt carrier from the stop by retracting the hammer. The bolt carrier also has a shoulder positioned for engaging the catch and causing it to release the hammer as the bolt carrier arrives at the firing position.

10 Claims, 13 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRIGGER MECHANISM

GOVERNMENT INTEREST

The invention described herein may be manufactured, used and licensed by or for the Government of governmental purposes without the payment to me of any royalties thereon.

BACKGROUND OF THE INVENTION

The present invention relates to trigger mechanisms for an automatic weapon and, in particular, to a device having a rapidly operable hammer for firing a weapon.

It is known to have a spring-biased bolt carrier that reciprocates with the assistance of a gas system driven by high pressure gas from the firing of a cartridge. These known systems allow the weapon to rapidly fire successive rounds without the need for operator intervention, provided the trigger is continuouslly depressed.

A disadvantage with the known mechanisms is that their components are too numerous and therefore unreliable and prone to jamming.

Accordingly, there is a need for a triggering mechanism useful for rapidly triggering an automatic weapon and employing relatively few parts.

SUMMARY OF THE INVENTION

In accordance with the illustrative embodiment demonstrating features and advantages of the present invention, there is provided a trigger mechanism for an automatic weapon having a receiver and a bolt carrier reciprocatably mounted in the receiver. The bolt carrier is biased to slide from a recoiled position to a firing position. The mechanism also has a hammer positioned alongside the bolt carrier and pivotally mounted on the receiver for reciprocating between a retracted and a striking position. Also included is a bias means attached to the hammer for urging it into a striking position. The mechanism also has a trigger rotatably mounted on the receiver and a catch means connected between the trigger and the hammer. The catch means can releasably hold the hammer and can retract the hammer in response to rotation of the trigger. The bolt carrier has a stop means and a toggle means. The stop means can engage the hammer and hold the bolt carrier at the recoiled position. The catch means is operable to release the bolt carrier from the stop means by retracting the hammer. The toggle means is positioned for engaging the catch means and causing it to release the hammer as the bolt carrier arrives at the firing position.

By employing such apparatus, a highly improved trigger mechanism is provided. In the preferred embodiment, an automatic weapon uses a spring loaded bolt carrier that uses a gas system to recoil the bolt carrier backwardly to compress the spring. This preferred mechanism employs a pivotally mounted trigger from which a lever articulates. This lever is used as a catch to hold a hammer. The hammer itself is used to hold the bolt carrier.

The preferred mechanism uses the trigger to rotate the lever and thus the hammer, causing it to retreat from a notch on the bolt carrier so that latter is driven forward. When the bolt carrier is driven to a firing position, preferably, a ridge on the carrier strikes the catch lever to release the hammer. Afterward the bolt carrier is returned by the preferred gas system and the hammer and lever are restored to a prefiring position by a ramp on the preferred bolt carrier. It will be noticed that this mechanism can work quickly with relatively few parts.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein.

DETAILED DESCRIPTION OF THE PREFERRED EMBODIMENT

Figure 1:
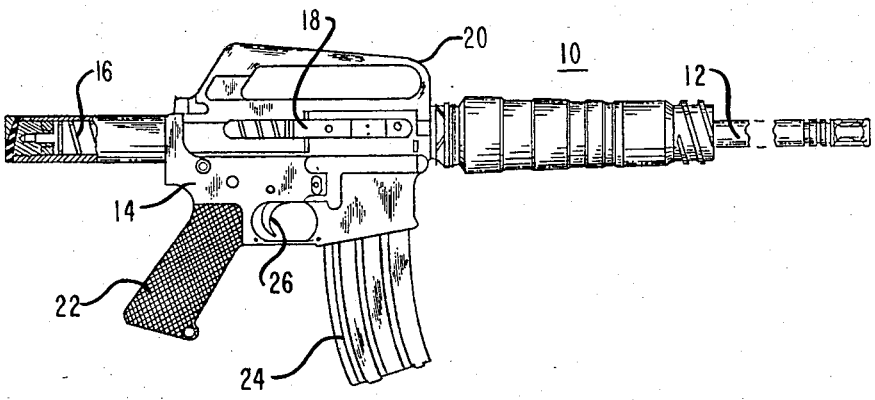
FIG. 1 is a side view of an automatic weapon incorporating principles of the present inventions.

Referring to FIG. 1, a weapon 10 is shown having a barrel 12, a receiver 14 and a compression spring 16 for forwardly biasing bolt carrier 18. The receiver 14 has a carrying handle 20 associated with it. Receiver 14 also has a butt handle 22 and a cartridge clip 24. The trigger 26 is rotatably mounted within the body of receiver 14.

Figure 2:
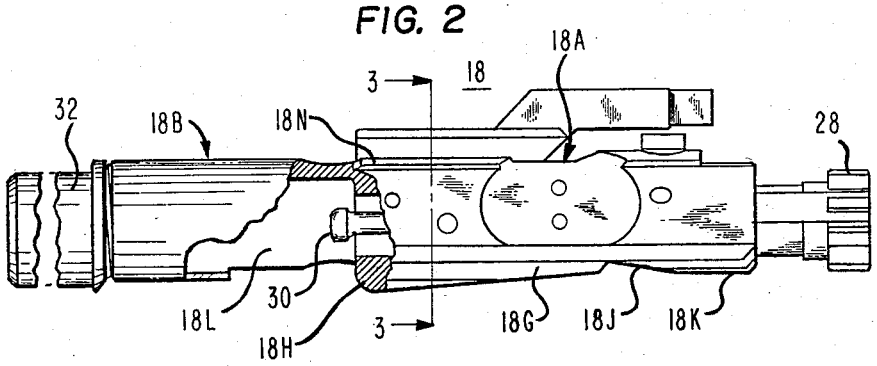
FIG. 2 is a side view of the bolt carrier in the weapon in FIG. 1.

Referring to FIG. 2, the bolt carrier 18 is shown separately and in further detail. Generally the bolt carrier has a cylindrical shape and supports on its forward end a breech member 28 for locking a bullet or cartridge (neither shown) into the chamber of the barrel of the weapon.

Coaxially mounted in the central body 18A of bolt carrier 18, is firing pin 30. Firing pin 30 extends forwardly through bolt carrier 18 to engage the cartridge that may lodge against the forward end of the breech 28. In a well known fashion, striking the firing pin 30 can cause a firing of the cartridge.

Figure 3:
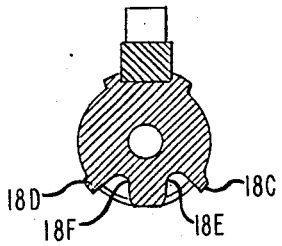
FIG. 3 is a cross-sectional view through lines 3—3 of FIG. 2.

Referring to FIGS. 2 and 3, bolt carrier 18 is seen to have a pair of flanges or splines 18C and 18D bordering a pair of longitudinal grooves 18E and 18F running the length of the section 18A of bolt carrier 18.

Figures 4, 7:
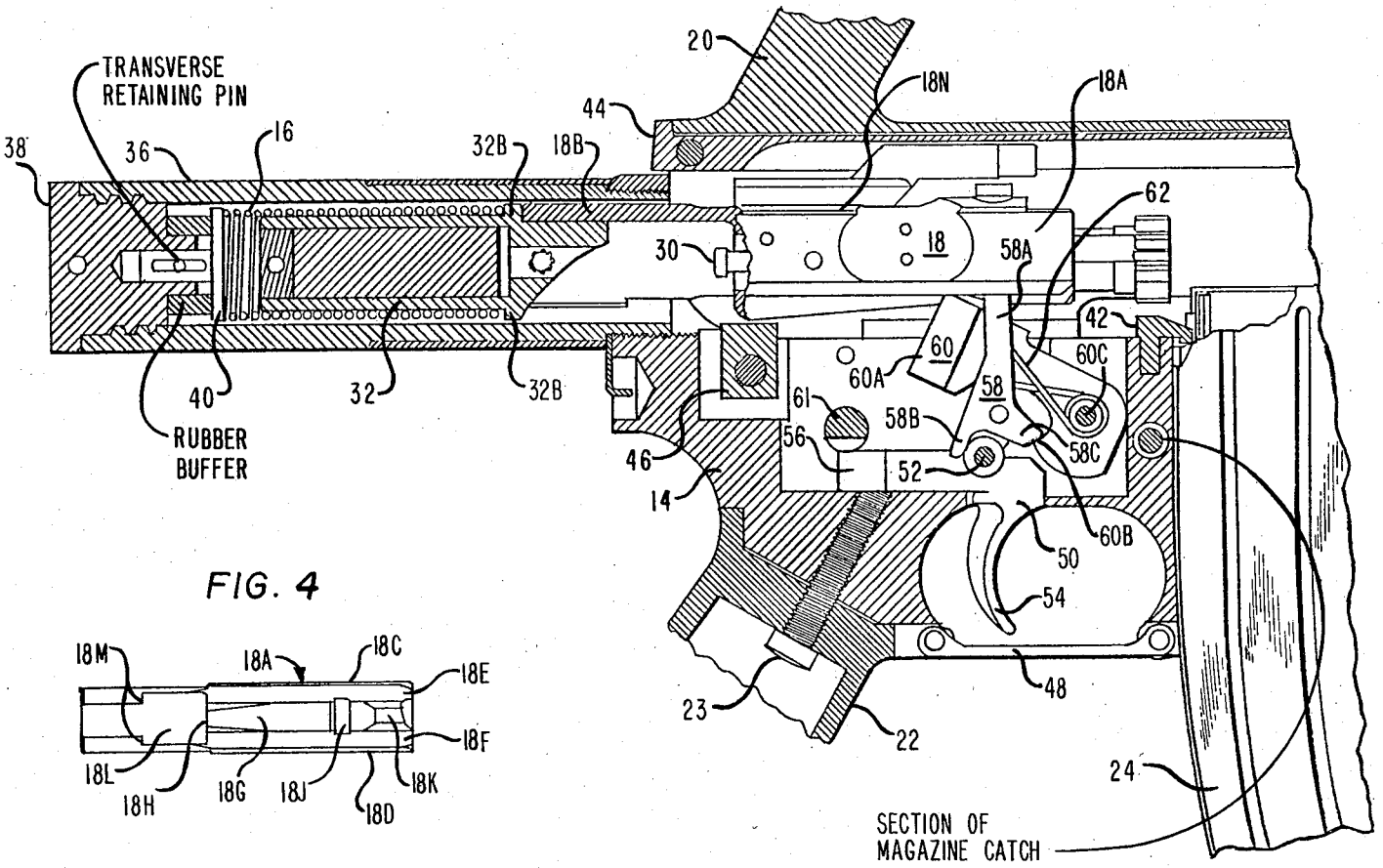
FIG. 4 is a bottom view (reduced scale) of the carrier of FIG. 2.
FIG. 7 is a side view, partially in sections of the receiver and associated components of FIG. 1.

Referring to FIGS. 2, 3 and 4, an axial ramp 18G is shown on the underside of bolt carrier section 18A. Axial ramp 18G diverges from bolt carrier section 18A in a rearward direction. Ramp 18G terminates at its aft end in a rounded, hammer-driving surface 18H. The opposite end of ramp 18G is bordered by a stop means, shown herein as notch 18J. Forward of notch 18J is another ramp 18K similar in construction to ramp 18G.

Aft of bolt section 18A is section 18B. Bolt section 18B is a hollow cylindrical member having on its underside an opening into an aft recess 18L. This opening is illustrated in FIG. 4 as having a narrow rear portion and a wider forward portion. A toggle means is shown herein as a pair of shoulder 18M forming what is referred to herein as the ridge of the aft recess 18L. Connected to the aft end of section 18B is the spring carrier 32 (FIG. 2) described hereinafter in further detail.

Figure 5:
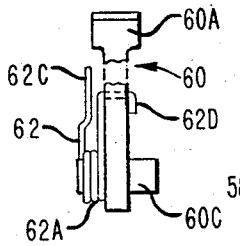
FIG. 5 is a front view of the hammer used in the weapon of FIG. 1.
Figure 6:
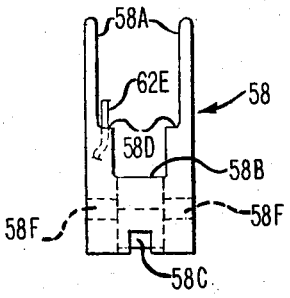
FIG. 6 is a back view of a lever used in the weapon of FIG. 1.

Referring to FIGS. 5, 6 and 7, previously mentioned receiver 14 is shown in a longitudinal, cross sectional view. The receiver 14 has an upper frame 44 connected to receiver 14 by bosses such as boss 46. Threaded to a rear aperture of receiver 14 is a spring case 36 closed at its aft end by threaded plug 38. Previously mentioned compression spring 16 is shown mounted around previously mentioned spring carrier 32. Carrier 32 is shown mounted on the open end of bolt section 18B, the insertion length being limited by flange 32B. The aft end of compression spring 16 is lodged against the head of support plate 40, which has a dependent central pin fitting into the illustrated bore of plug 38.

Bolt carrier 18 is illustrated with several splines, such as spline 18N. These and the other splines are the sliding surfaces which contact a cylindrical bore through upper frame 44.

Butt handle 22 is attached to receiver 14 by screw 23. Clip 24 is held to receiver 14 by a magazine latch. Receiver 14 has an outline formed into a alcove spanned by trigger guard 48. A trigger 50 is shown rotatably mounted to receiver 14 at pivot point 52. The outwardly projecting, fingering portion 54 of trigger 50 is approximately at right angles to tang 56. The remaining arm of trigger 50 (shown more clearly hereinafter) projecting upwardly at an angle of approximately 110° with respect to tang 56. An eccentric 61 is rotatably mounted in receiver 14. The eccentric 61 is in the form of a cylindrical rod having a central flattened surface. As illustrated the eccentric faces the outer end of tang 56 and acts as a stop against clockwise motion of the tang.

This upper arm of trigger 50 has articulating from it a lever 58, also referred to as a catch means. From the side, lever 58 generally has an inverted Y shape. Lever 58 also has upper bifurcated arm 58A (bifurcation a pair of members shown more clearly hereinafter). The aft, notched, lower arm 58B acts as a stop against the central hub of trigger 50 while the forward, lower arm 58C acts as a spur.

Rotatably mounted in receiver 14 is hammer 60 having a thickened outer end 60A. Projecting at an acute angle with respect to the thickened end 60A is a tripping arm 60B, sized and positioned to engage the spur 58C.

A bias means is shown herein as coil spring 62, coaxially mounted around the hub 60C of hammer 60. As disclosed hereinafter in further detail, spring 62 urges hammer 60 and lever 58 to rotate in opposite directions, clockwise and counterclockwise, respectively.

Referring to FIG. 5, the forward side of hammer 60 is shown with spring 62 coiled about hub 60C. Spring 62 is a symmetrical spring with the right portion (this view) broken away for clarity. The left coil **62*a* terminates in an upper arm 62C. Coil 62A and a right coil (not shown) is spanned by inverted, U-shaped wired 62D**.

Referring to FIG. 6, the previously illustrated lever 58 is shown having a pair of arms 58A forming a bifurcation in this rear view. Spur 58C is partially visible through a lower notch in aft arm 58B. Members 58A are shown with their upper reaches narrowed to provide shoulders 58D. Shoulders 58D, act as a surface against which the upper end 62E of the spring can act. (End 62E is the end complementing end 62C of FIG. 5). The bore 58F for journaling lever 58 is shown herein in phantom.

Figure 8A:
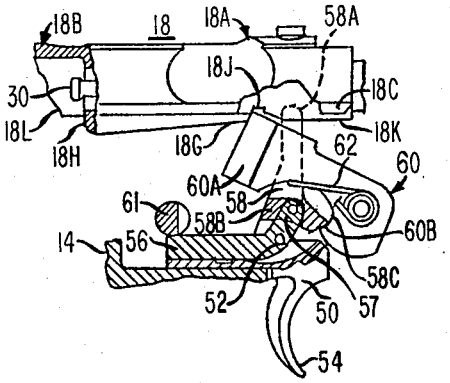
FIG. 8A shows a portion of the mechanism of FIG. 7 placed in a safe, seared position.

Referring to FIG. 8A a partially sectioned view of some of the components from FIG. 7 are given, special attention being given to trigger 50, hammer 60 and bolt carrier 18. A portion of spline 18C is broken away for illustrative purposes and to reveal more clearly the notch 18G. Because it is sectional, lever 58 is seen as composed of two symmetrical, Y-shaped halves spanned by transverse spur 58C and the transverse element composing arm 58B. The tip of the upper portion of lever 58A is shown in phantom since it is on the far side of carrier section 18A, riding in the groove flanked by spline 18D (not visible this view but complementary to spline 18C).

Also clearly shown in this view is that trigger 50 is formed by a lower fingering portion 54 that extends backwardly and underlies the bulk of the tang section 56. Tang section 56 essentially lays in a U-shaped channel cut into the upper surface of triggering portion 54. The tang portion 56 extends forwardly and is crooked upwardly at about 110°, pivot 52 being located at the crook. The upper end 57 of tang portion 56 has a transverse bore for pivotally supporting lever 58. It is noted that the upper reach of portion 57 is surrounded on all sides by the framework of lever 58. Due to the proximity of the transverse members 58B and 58C, the freedom of motion of lever 58 about portion 57 is limited.

In this view, eccentric 61 is shown rotated 90° in comparison to the position shown in FIG. 7. Accordingly, the eccentric bears upon the rearmost end of tang 56, thereby holding it against the wall of receiver 14. Under these circumstances, trigger 50, including its tang section 56, cannot move. Therefore, the striking face of hammer head 60A remains lodged in notch 18G. Although bolt carrier 18 is urged forward by compression spring 16 (FIG. 7) the connection between hammer head 60A and notch 18G prevents any movement.

Figure 8B:
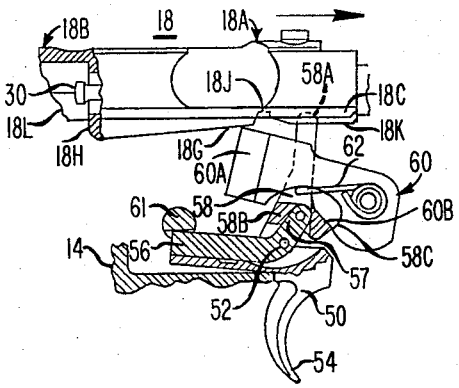
FIG. 8B shows the condition of the mechanism of FIG. 8A immediately after pulling the trigger.

To facilitate an understanding of the principles associated with the foregoing apparatus its operation will now be brief described. To allow firing of the weapon, eccentric 61 is rotated 90° to the position shown in FIG. 8B. It will be noticed the coil of spring 62, is translationally fixed at the pivot of hammer 60 and urges lever 58 and hammer 60 in opposite directions. Spring 62 urges lever 58 to rotate counterclockwise so that the stop 58B of the lever is driven fully against the rearward face of arm 57. Similarly, hammer 60 is urged to rotate clockwise but the contact between tripping arm **60*b* and spur 58*c*** prevents further rotation.

When the trigger 50 is pulled, it rotates arm 57 clockwise to drive spur 58C into arm 60B and rotates hammer 60 counterclockwise. The rotation of hammer 60 is sufficient to draw it away from notch 18J so that bolt carrier 18 begins to move into the position illustrated in FIG. 8B. As bolt carrier 18 travels forwardly, it does not immediately disturb lever 58. Accordingly, the spur 58C remains in contact with the arm 60B so that hammer 60 is not free to rotate clockwise.

As bolt carrier 18 travels forwardly, it does, to a limited extent, drive hammer 60 counterclockwise through the inclined surface of axial ramp 18G. Eventually, hammer head 60A rides past the rounded edge 18H marking the transition between the forward and rear sections 18A and 18B, respectively, of bolt carrier 18. However, hammer 60 does not rotate into recess 18L because of the previously described holding action provided by spur 58C. It will be noted that as bolt carrier 18 travels forwardly, the upper sections 58A of the lever 58 are not immediately disturbed since they ride in the grooves flanked by the splines such as spline 18C.

Figure 8C:
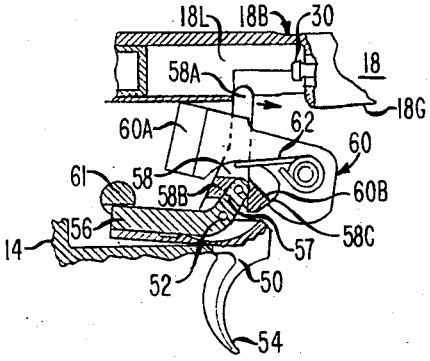
FIG. 8C shows the mechanism of FIG. 8B just prior to release of the hammer.

Eventually, bolt carrier 18 travels sufficiently forward that the upper portions 58A of lever 58 and hammer 60 are protruding into recess 18L. It will be noted that for the positions illustrated in FIG. 8C, the corner of hammer 60 protruding into recess 18L does not touch the sides of recess 18L since hammer head 60A is sized to fit within the narrower opening on the underside of recess 18L. The shoulder 18M of recess 18L, however, engages the tip of lever arm 58A. Consequently, continued forward motion of bolt carrier 18 from the position illustrated in FIG. 8C causes clockwise rotation of lever 58, in opposition spring 62. As a result, spur 58C begins to move away from its seared position on arm 60B of hammer 60.

Figure 8D:
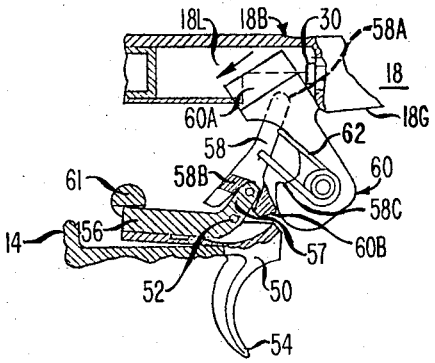
FIG. 8D shows the position of the mechanism of FIG. 8C at the instant of firing.
Figure 8E:
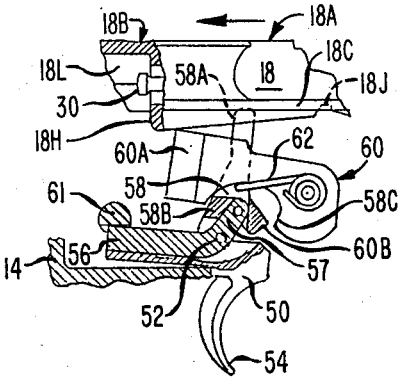
FIG. 8E shows the mechanism of FIG. 8D as the gas system causes the bolt carrier to recoil.

Eventually hammer 60 is released and is driven clockwise under the driving force of spring 62 against firing pin 30, as illustrated in FIG. 8D. Lever 58 has also rotated clockwise somewhat due to the momentum imparted to it by its collision with the shoulder 18M of bolt carrier 18. The striking of firing pin 30 causes a shock that fires the cartridge adjacent to the forward end of the bolt carrier 18. Such firing produces high pressure gas from the combustion of the explosives of the cartridge. In a well known fashion, this explosive gas may be used to drive bolt carrier 18 backwards as shown in FIG. 8E. This backward motion causes the shoulder 18H of bolt carrier 18 to engage the forward face of hammer head 60A and drive it counterclockwise as shown.

Since hammer head 60A is now riding on the elevated portion of axial ramp 18G, it has freed itself from the connection to spur 58C of lever 58. Therefore, lever 58 is free to rotate counterclockwise under the driving action of spring 62 until stopped by element 58*b* touching trigger 50. Trigger 50 has cylindrical bosses protruding coaxially with pivot pin 52, through which pin 52 passes. Element 58*b* contacts these bosses. As hammerhead 60A rides down axial ramp 18G, its spur 58G returns clockwise against hammer arm 60B returns clockwise against spur 58C so that hammer 60 is now seared.

Figure 8F:
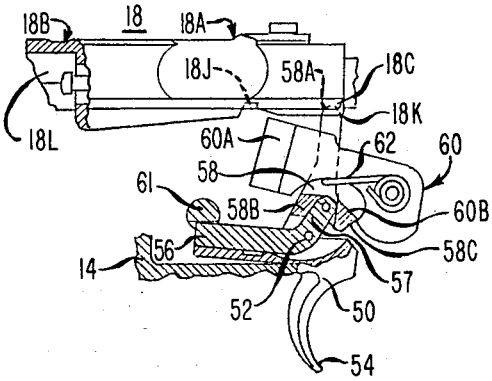
FIG. 8F shows the mechanism of FIG. 8E with the bolt carrier recoiled backwardly to the maximum extent.

The inertia of bolt carrier 18 due to the force from the gas driving system (not shown) drives carrier 18 fully backwards to the position illustrated in FIG. 8F, the rearward travel being limited by impact with a rubber buffer through support plate 40. If the trigger 50 is kept in the position shown then hammer head 60A will remain sufficiently withdrawn to escape notch 18J. Consequently, hammer head 60A will pass notch 18J and return to the position shown in FIG. 8B to repeat another cycle. If the trigger 50 is released before hammer head 60A reaches notch 18J, a different result occurs. In particular, trigger arm 57 will rotate counterclockwise to so move spur 58C that hammer head 60A will descend onto ramp 18K. Consequently, the forward motion of carrier 18 will result in hammer head 60A sliding down ramp 18K into notch 18J to prevent further motion of bolt carrier 18. If the eccentric 61 is now engaged, the apparatus returns to the condition initially illustrated in FIG. 8A.

It is to be appreciated that various modifications may be implemented with respect to the above described preferred embodiment. While a single spring is shown for driving the lever, hammer and trigger, in some embodiments two or more springs may be used to separately drive these components. While a torsional spring is shown, in some embodiments a compression spring may be linked to various extensions of the components to drive them in the desired direction. Also while the hammer is shown engaging a notch, in some embodiments it may engage a shoulder of a simple protusion. Furthermore, the trigger tang illustrated for safety purposes may be eliminated where an alternate safety is employed. While a bifurcated lever is shown as a catch, in some embodiments bifurcation may be unnecessary and a single, upwardly extended lever arm may be employed instead. Moreover, various shapes, sizes and dimensions of the various illustrated components can be altered depending upon the desired strength, capacity, speed of operation, reliability, etc.

Obviously, many modifications and variations of the present invention are possible in light of the above teachings. It is, therefore, to be understood that within the scope of the appended claims, the invention may be practiced otherwise than as specifically described.

What is claimed is:

1. A trigger mechanism for an automatic weapon comprising:
   - a receiver;
   - a bolt mechanism reciprocatably mounted in said receiver and biased to slide from a recoiled position to a firing position;
   - a hammer positioned alongside said bolt mechanism and pivotally mounted on said receiver for reciprocating between a retracted and a striking position;
   - bias means attached to said hammer for urging it into a striking position;
   - a trigger rotatably mounted on said receiver; and
   - catch means connected between said trigger and said hammer for releasably holding said hammer, said catch means being operable to retract said hammer in response to rotation of said trigger, said bolt mechanism including:
   - stop means for engaging said hammer and holding said bolt mechanism at said recoiled position, said catch means being operable to release said bolt mechanism from said stop means by retracting said hammer; and
   - toggle means positioned for engaging said catch means and causing it to release said hammer as said bolt mechanism arrives at said firing position.

2. A trigger mechanism according to claim 1 wherein said catch means comprises:
   - a lever pivotally mounted on said trigger and extending toward said bolt mechanism.

3. A trigger mechanism according to claim 2 wherein said hammer includes:
   - an arm projecting toward said lever when said hammer is in said retracted position, said lever having a spur sized to engage said arm and keep said hammer in said retracted position.

4. A trigger mechanism according to claim 3 wherein said toggle means of said bolt mechanism has a ridge projecting toward said lever for rotating it and causing said spur to release said hammer upon said bolt mechanism arriving at said firing position.

5. A trigger mechanism according to claim 4 wherein said stop means includes a notch on the surface of said bolt mechanism sized to receive said hammer, said spur being mounted to articulate from said trigger and sized to rotate said hammer retractively in response to rotation of said trigger.

6. A trigger mechanism according to claim 5 wherein said bias means is operable to urge said hammer and said lever to rotate in opposite directions, said lever having limited freedom of rotation, said bias means being operable to rotate said lever to the extent its freedom allows when said spur of said lever is engaging said arm of said hammer, said bias means being operable to retractively rotate said trigger.

7. A trigger mechanism according to claim 6 wherein said bolt mechanism includes an axial ramp positioned to retractively drive said hammer and lift its arm beyond interference with said spur of said lever, so that said bias means can return said lever to the full extent permitted by its freedom of rotation during mechanism recoil of said bolt mechanism.

8. A trigger mechanism according to claim 7 wherein said ridge of said bolt mechanism borders an aft recess in said mechanism, said bolt mechanism also including:

a coaxial firing pin positioned to be struck by said hammer upon said bolt mechanism arriving at said firing position and said ridge rotating said lever.

9. A trigger mechanism according to claim 8 wherein said lever includes:

a pair of members straddling said hammer, said aft recess in said bolt mechanism having an opening comprising a narrow portion contiguous to a wider portion, said ridge comprising the transition from said wider portion to said narrower portion to form a pair of shoulders, said members of said lever being sized and positioned to be driven by said shoulders upon said bolt mechanism arriving at said firing position.

10. A trigger mechanism according to claim 9 wherein said trigger includes:

a tang; and a manually rotatable eccentric mounted in said receiver alongside said tang for rotating against said tang and eliminating the freedom of rotation of said trigger.

* * * * *